United States Patent
Murakami et al.

(10) Patent No.: US 8,562,895 B2
(45) Date of Patent: Oct. 22, 2013

(54) PROCESS OF MANUFACTURING INORGANIC NANOFIBERS

(75) Inventors: Yasushi Murakami, Nagano (JP); Hisanao Usami, Nagano (JP); Tomohiro Nishikawa, Nagano (JP); Takashi Tarao, Ibaraki (JP); Rie Watanabe, Ibaraki (JP); Masaaki Kawabe, Ibaraki (JP); Takashi Nishitani, Ibaraki (JP)

(73) Assignees: Shinshu University, Nagano (JP); Japan Vilene Company, Ltd., Tokyo (JP)

( * ) Notice: Subject to any disclaimer, the term of this patent is extended or adjusted under 35 U.S.C. 154(b) by 347 days.

(21) Appl. No.: 12/645,538

(22) Filed: Dec. 23, 2009

(65) Prior Publication Data

US 2010/0164145 A1 Jul. 1, 2010

(30) Foreign Application Priority Data

Dec. 25, 2008 (JP) ................................. 2008-330185

(51) Int. Cl.
*B29C 47/00* (2006.01)
(52) U.S. Cl.
USPC .......................................... 264/433; 977/840
(58) Field of Classification Search
USPC ....................................................... 264/433
See application file for complete search history.

(56) References Cited

U.S. PATENT DOCUMENTS

2003/0005723 A1   1/2003   Kawabe et al. ..................  17/12

FOREIGN PATENT DOCUMENTS

| CN | 101235556 A | 8/2008 |
|---|---|---|
| CN | 101235558 A | 8/2008 |
| EP | 1264804 | 11/2002 |
| JP | 2003-073964 | 3/2003 |
| JP | 2006-328578 | 7/2006 |
| WO | 2008/111609 | 9/2008 |

OTHER PUBLICATIONS

Dan Li et al., "Fabrication of Ceramic and Composite Nanofibers by Electrospinning", Polymer Preprints, 2003, 44(2), 65-66.
European Search Report for corresponding European Patent Application No. EP09180126.
Dan Li et al., "Electrospinning: A Simple and Versatile Technique for Producing Ceramic Nanofibers and Nanotubes", Journal of the American Ceramic Society, vol. 89(6), 1861-1869 (2006).
Dan Li et al., "Electrospinning of Polymeric and Ceramic Nanofibers as Uniaxially Aligned Arrays", Nano Letters 2003, vol. 3(8), 1167-1171.
Wiwat Nuansing et al., "Structural characterization and morphology of electrospun $TiO_2$ nanofibers", Materials Science and Engineering, B 131 (2006) 147-155.
Y. Takasu et al., "Design of oxide electrodes with large surface area", Electrochimica Acta 45 (2000) 4135-4141.

*Primary Examiner* — Robert J Grun
(74) *Attorney, Agent, or Firm* — Heslin Rothenberg Farley & Mesiti P.C.

(57) ABSTRACT

A process of manufacturing inorganic nanofibers, without using an organic polymer, using a highly reactive metal alkoxide such as titanium alkoxide or zirconium alkoxide, in particular, a process in which inorganic nanofibers can be stably produced over a long period, is provided. It is a process of manufacturing inorganic nanofibers by electrospinning using a sol solution containing an inorganic component as a main component, characterized in that the sol solution contains a metal alkoxide having a high reactivity and a salt catalyst, and that the salt catalyst is an amine compound having an N—N bond, an N—O bond, an N—C=N bond, or an N—C=S bond.

4 Claims, No Drawings

PROCESS OF MANUFACTURING INORGANIC NANOFIBERS

TECHNICAL FIELD

The present invention relates to a process of manufacturing inorganic nanofibers, without using an organic polymer, using a highly reactive metal alkoxide such as titanium alkoxide or zirconium alkoxide. In particular, the present invention relates to a process in which inorganic nanofibers can be stably produced over a long period.

BACKGROUND ART

As processes of manufacturing inorganic nanofibers by electrospinning, a process in which a precursor solution containing a metal alkoxide and an organic polymer is sintered after spinning, and a process in which a spinnable sol solution prepared from a metal alkoxide without using an organic polymer is spun, are known.

The process in which a precursor solution containing a metal alkoxide and an organic polymer is used for spinning is disclosed in, for example, non patent literature 1 and patent literature 1. A disadvantage of this process is that the obtained fibers are very brittle. This is because the precursor solution contains a large amount of the organic polymer to fiberize the precursor solution, and thus, many micropores are formed in the inorganic nanofibers obtained after sintering.

The process in which a spinnable sol solution is spun is disclosed in patent literature 2. In this invention, because the sol per se, which is used as a spinning material, is spinnable, an organic polymer is not needed, and thus, a nanofiber sheet strong enough to be handled can be produced. Although a process of manufacturing silica nanofibers was referred to in the invention disclosed in patent literature 2, a process of preparing a spinnable sol using a highly reactive metal alkoxide such as titanium alkoxide or zirconium alkoxide was not referred to.

CITATION LIST

Non Patent Literature

[non patent literature 1] Polymer Preprints, 2003, 44(2), p. 65
Patent Literature
[patent literature 1] Japanese Unexamined Patent Publication (Kokai) No. 2006-328578
[patent literature 2] Japanese Unexamined Patent Publication (Kokai) No. 2003-73964

SUMMARY OF INVENTION

Technical Problem

An object of the present invention is to provide a process of manufacturing inorganic nanofibers, without using an organic polymer, using a highly reactive metal alkoxide such as titanium alkoxide or zirconium alkoxide, in particular, a process in which inorganic nanofibers can be stably produced over a long period.

Solution to Problem

The present invention relates to
[1] a process of manufacturing inorganic nanofibers by electrospinning using a sol solution containing an inorganic component as a main component, characterized in that the sol solution contains a metal alkoxide having a high reactivity and a salt catalyst, and that the salt catalyst is an amine compound having an N—N bond, an N—O bond, an N—C=N bond, or an N—C=S bond;
[2] the process of [1], wherein the sol solution further contains an additive to control the reactivity of the metal alkoxide;
[3] inorganic nanofibers prepared by forming inorganic gel fine fibers by electrospinning using the sol solution described in [1] or [2], and heat-treating the inorganic gel fine fibers to obtain the inorganic nanofibers, wherein an unreacted alkoxy group of the metal alkoxide remains; and
[4] inorganic nanofibers having micropores prepared by forming inorganic gel fine fibers by electrospinning using the sol solution described in [1] or [2], and heat-treating the inorganic gel fine fibers to obtain the inorganic nanofibers.

Advantageous Effects of Invention

According to the present invention, a sol solution having an excellent spinnability can be prepared by using a specific salt catalyst.

According to a preferred embodiment of the present invention using an additive to control the reactivity of a metal alkoxide, a sol-gel reaction can be controlled by coordination to the metal alkoxide and, as a result, the lifetime of the sol can be extended and a sol solution having an excellent continuous spinnability can be prepared.

DESCRIPTION OF EMBODIMENTS

The process of the present invention is an improvement invention of electrospinning using a sol solution containing an inorganic component as a main component. The process of the present invention may be carried out in a similar fashion to conventional electrospinning, except that the sol solution contains a metal alkoxide having a high reactivity and a specific salt catalyst (preferably, together with an additive to control the reactivity of the metal alkoxide).

The process of the present invention may comprise, for example, the steps of:
preparing a sol solution consisting mainly of an inorganic component,
extruding the sol solution from a nozzle, and at the same time, drawing the extruded sol solution by applying an electrical field to the extruded sol solution, to thereby form inorganic gel fine fibers (preferably, to thereby accumulate inorganic gel fine fibers on a support), and sintering the inorganic gel fine fibers to produce inorganic sintered fine fibers (preferably, to produce an inorganic article containing inorganic sintered fine fibers).

In the process of the present invention, a metal alkoxide having a high reactivity is used as an inorganic material which is added to the sol solution. The phrase "metal alkoxide having a high reactivity" as used herein means a metal alkoxide which reacts in air without a catalyst. Examples of a metal alkoxide which may be used in the present invention include alkoxides of titanium, zirconium, aluminum, tin, and hafnium.

The salt catalyst used in the process of the present invention is not particularly limited, so long as it is an amine compound in which N, O, and/or S atoms having lone pairs form an N—N bond, an N—O bond, an N—C=N bond, or an N—C=S bond.

Examples of an amine compound having the N—N bond include salts obtainable by neutralizing a hydrazine derivative with an acid, such as, hydrazine monohydrochloride ($H_2N$—$NH_2$.HCl) and hydrazinium chloride ($H_2N$—$NH_2$.2HCl).

Examples of an amine compound having the N—O bond include salts obtainable by neutralizing hydroxylamine (HO—NH$_2$) with an acid.

Examples of an amine compound having the N—C=N bond include salts obtainable by neutralizing acetamidine [H$_3$C—C(=NH)—NH$_2$] or guanidine with an acid.

Examples of an amine compound having the N—C=S bond include salts obtainable by neutralizing a thiouric acid derivative, a thiuram derivative, or a dithiocarbamic acid derivative with an acid.

It is preferable that these catalysts are used within the range from neutral pH to acidic pH.

The additive to control the reactivity of the metal alkoxide, which may be used in the process of the present invention, is not particularly limited, so long as it can control the reactivity of the metal alkoxide, in particular, a sol-gel reaction. For example, a ligand capable of coordinating to the metal alkoxide may be used as the additive. Examples of the additive include glycols (such as diethylene glycol), β-diketones (such as acetylacetone), alkanolamines (such as diethanolamine), carboxylic acids, α-hydroxycarboxylic acid esters (such as ethyl lactate), and hydroxynitriles.

The inorganic nanofibers of the present invention include inorganic nanofibers wherein one or more unreacted alkoxy groups of the metal alkoxide remain, and inorganic nanofibers having micropores.

These inorganic nanofibers may be produced by forming inorganic gel fine fibers by electrospinning using the sol solution used in the process of the present invention, and heat-treating the inorganic gel fine fibers at an appropriate temperature.

The inorganic nanofibers of the present invention wherein unreacted alkoxy groups of the metal alkoxide remain may be produced by forming inorganic gel fine fibers by electrospinning using the sol solution used in the process of the present invention, and heat-treating the inorganic gel fine fibers at a temperature such that unreacted alkoxy groups remain after the heat treatment.

The state in which unreacted alkoxy groups remain means a state after a heat treatment at a relatively low temperature from room temperature to about 200° C., and thus, is a state in which inorganic nanofibers can be contracted by a further heat treatment at a higher temperature. Therefore, a ceramic plate reinforced with inorganic nanofibers may be produced by forming a fiber web containing such inorganic nanofibers; filling interstices of the fiber web with, for example, inorganic particles capable of converting into ceramics by sintering; and sintering the fiber web. In this procedure, the inorganic particles capable of converting into ceramics by sintering are constructed by the sintering, and at the same time, the fiber web of inorganic nanofibers is constructed, and thus, a ceramic plate reinforced with inorganic nanofibers can be produced, without a break in the fiber web.

In case a ligand is used, the ligand also remains. The existence of remaining alkoxy groups and a remaining ligand can be determined, for example, by a Fourier transform infrared spectrophotometer (FT-IR).

The inorganic nanofibers having micropores of the present invention may be produced by forming inorganic gel fine fibers by electrospinning using the sol solution used in the process of the present invention, and heat-treating the inorganic gel fine fibers at a temperature such that, after the heat treatment, organic components such as an alkoxy group and a ligand disappear, but sintering does not fully proceed and densification is not completed.

The state having micropores is a state after a heat treatment at a temperature such that organic components such as an alkoxy group and a ligand disappear, but sintering does not fully proceed and densification is not completed. The temperature at which organic components disappear varies according to the molecular weight or the like of each organic component, and is generally about 200° C. or more, but is not limited thereto. The temperature so that densification is not completed varies according to the type of the inorganic component, and is about 400° C. to 600° C.

Because the inorganic nanofibers have micropores, a desired function may be imparted to the inorganic nanofibers by introducing one or more inorganic components and/or organic components into the micropores.

The size of the micropore is 2 nm or less, the existence of micropores can be determined by measuring the specific surface area of the fibers by a BET method. More particularly, it can be presumed that the fibers have micropores, when the specific surface area (SAa) actually measured by the BET method is twice or more the specific surface area (SAc) calculated from the average fiber diameter and the density of the fiber.

EXAMPLES

The present invention now will be further illustrated by, but is by no means limited to, the following Examples.

Example 1

As a material liquid, titanium tetra-n-butoxide [Ti(OnBu)$_4$], ethyl lactate, hydrazine monohydrochloride, water, and 2-propanol were mixed at a molar ratio of 1:1:0.02:1.5:25, stirred at room temperature for 3 days, and concentrated to 33% by weight as a concentration of titanium oxide (TiO$_2$). Ti(OnBu)$_4$, ethyl lactate, and hydrazine monohydrochloride function as the inorganic material, the ligand, and the catalyst, respectively.

Electrospinning using this material liquid was carried out under the following conditions:
Flow rate of spinning solution: 1 g/hr
Distance between the nozzle tip and the target: 10 cm
Temperature and humidity in spinning atmosphere: 25° C. and 45% RH
Applied voltage: 10 kV A stable spinning could be maintained for 2 hours or more in this Example.

The obtained gel fiber web sheet was sintered by gradually raising the temperature to 600° C. over 2 hours and then maintaining the temperature at 600° C. for 2 hours to obtain a sintered fiber sheet. The average fiber diameter after sintering was 800 nm. X ray diffraction was measured to reveal that titanium oxide existed in the anatase form.

This sintered fiber sheet was analyzed by a Fourier transform infrared spectrophotometer (FT-IR), and neither a peak of a butoxy group nor a peak of carbonyl group of the ligand was observed.

The specific surface area of the sintered fiber sheet, as determined by a BET method, was 2.4 m$^2$/g. The specific surface area (SAc) of the fibers calculated from the average fiber diameter (800 nm) and the density (4 g/cm$^3$) of the sintered fiber sheet was 1.3 m$^2$/g, and thus, it was considered that the sintered fibers did not have micropores.

Example 2

As a material liquid, zirconium tetra-n-butoxide [Zr(OnBu)$_4$], ethyl acetoacetate, hydrazinium chloride, water, and butanol were mixed at a molar ratio of 1:2:0.025:2:22, stirred at room temperature for 15 hours, and concentrated until the mixture became viscous. The resulting viscous mixture was further thickened by the heating at 60° C. Zr(OnBu)$_4$, ethyl acetoacetate, and hydrazinium chloride function as the inorganic material, the ligand, and the catalyst, respectively.

Electrospinning using this material liquid was carried out under the following conditions:

Flow rate of spinning solution: 1 g/hr

Distance between the nozzle tip and the target: 10 cm

Temperature and humidity in spinning atmosphere: 25° C. and 45% RH

Applied voltage: 10 kV

A stable spinning could be maintained for 2 hours or more in this Example.

The obtained gel fiber web sheet was sintered by gradually raising the temperature to 800° C. over 2 hours and then maintaining the temperature at 800° C. for 2 hours to obtain a sintered fiber sheet. The average fiber diameter after sintering was 600 nm. X ray diffraction was measured to reveal that the fibers were composed of zirconium oxide (ZrO$_2$).

Example 3

As a material liquid, a composition in which ethyl acetate was excluded from the composition described in Example 1, i.e., titanium tetra-n-butoxide [Ti(OnBu)$_4$], hydrazine monohydrochloride, water, and 2-propanol were mixed at a molar ratio of 1:0.02:1.5:25, stirred at room temperature for 1 day, and concentrated to 32% by weight as a concentration of titanium oxide.

Electrospinning using this material liquid was carried out under the following conditions:

Flow rate of spinning solution: 1 g/hr

Distance between the nozzle tip and the target: 10 cm

Temperature and humidity in spinning atmosphere: 25° C. and 45% RH

Applied voltage: 10 kV

Fibers could be produced in this Example, and the obtained gel fiber web sheet was sintered at 600° C. to obtain a sintered fiber sheet consisting of titanium oxide fibers having an average fiber diameter of 400 nm. However, solidification occurred at the tip of the nozzle within 10 minutes, and thus, a stable spinning could not be maintained.

Comparative Example 1

As a material liquid, titanium tetra-isopropoxide [Ti(OiPr)$_4$], acetylacetone, nitric acid, water, and 2-propanol were mixed at a molar ratio of 1:2:0.02:1.5:25, stirred at room temperature for 1 day, and concentrated to 30% by weight as a concentration of titanium oxide. Ti(OiPr)$_4$, acetylacetone, and nitric acid function as the inorganic material, the ligand, and a catalyst, respectively.

Electrospinning using this material liquid was carried out under the following conditions:

Flow rate of spinning solution: 1 g/hr

Distance between the nozzle tip and the target: 10 cm

Temperature and humidity in spinning atmosphere: 25° C. and 45% RH

Applied voltage: 10 kV

The collected fibers could not be handled as a sheet, because the fiber lengths of the fibers were short and the fiber diameters thereof were ununiform, and many droplets were contained. Further, solidification occurred at the tip of the nozzle within 10 minutes, and thus, a stable spinning could not be maintained.

Examples 4 to 12

(1) Production of Sintered Fiber Sheets

Sintered fiber sheets were produced in accordance with the conditions of preparing a spinning solution, the conditions of spinning, and the conditions of sintering described in Example 1, except that material liquids having the compositions shown in Table 1 were used as spinning solutions.

A stable spinning could be maintained for 30 minutes or more in these Examples. The average fiber diameters after sintering are shown in Table 1.

In Table 1, the abbreviations "Ti(OnBu)$_4$", "Ti(OiPr)$_4$", and "2-PrOH" mean titanium tetra-n-butoxide, titanium tetra-isopropoxide, and 2-propanol, respectively.

TABLE 1

| | Alkoxide (a) | Ligand (b) | Catalyst (c) | solvent (d) | Mixing ratio (molar ratio) a:b:c:H$_2$O:d | Fiber diameter |
|---|---|---|---|---|---|---|
| Example 1 | Ti(OnBu)$_4$ | ethyl lactate | hydrazine monohydrochloride | 2-PrOH | 1:1:0.02:1.5:25 | 800 nm |
| Example 4 | Ti(OnBu)$_4$ | ethyl lactate | hydrazinium chloride | 2-PrOH | 1:1:0.01:1.5:14.7 | 700 nm |
| Example 5 | Ti(OnBu)$_4$ | ethyl lactate | hydroxylamine hydrochloride | 2-PrOH | 1:1:0.02:1.5:14.7 | 300 nm |
| Example 6 | Ti(OnBu)$_4$ | ethyl lactate | guanidine hydrochloride | 2-PrOH | 1:1:0.02:1.5:14.7 | 600 nm |
| Example 7 | Ti(OnBu)$_4$ | ethyl lactate | acetoamidine hydrochloride | 2-PrOH | 1:1:0.02:1.5:14.7 | 700 nm |
| Example 8 | Ti(OiPr)$_4$ | ethyl lactate | hydrazine monohydrochloride | 2-PrOH | 1:1:0.02:1.5:14.7 | 700 nm |
| Example 9 | Ti(OiPr)$_4$ | ethyl lactate | hydroxylamine hydrochloride | 2-PrOH | 1:1:0.02:1.5:14.7 | 250 nm |
| Example 10 | Ti(OiPr)$_4$ | ethyl lactate | guanidine hydrochloride | 2-PrOH | 1:1:0.02:1.5:14.7 | 450 nm |
| Example 11 | Ti(OiPr)$_4$ | ethyl lactate | acetoamidine hydrochloride | 2-PrOH | 1:1:0.02:1.5:14.7 | 600 nm |
| Example 12 | Ti(OnBu)$_4$ | (a) ethyl lactate + (b) lactic acid | hydrazine monohydrochloride | 2-PrOH | 1:((a)1:(b)0.1):0.02:1.5:14.7 | 900 nm |

Example 13

The gel fiber web sheet prepared in Example 1 was dried at 150° C. for 30 minutes. The average fiber diameter after drying was 920 nm. This dried gel fiber sheet was analyzed by FT-IR, and a peak due to a butoxy group and a peak due to the carbonyl group of the ligand were observed.

Example 14

The gel fiber web sheet prepared in Example 1 was sintered by gradually raising the temperature to 450° C. over 2 hours and then maintaining the temperature at 450° C. for 2 hours. The average fiber diameter after sintering was 840 nm. The resulting sintered fiber sheet was analyzed by FT-IR, and neither a peak due to a butoxy group nor a peak due to the carbonyl group of the ligand was observed.

The specific surface area of the sintered fiber sheet, as determined by a BET method, was 45 m$^2$/g. The specific surface area (SAc) of the fibers calculated from the average fiber diameter (840 nm) and the density (4 g/cm$^3$) of the sintered fiber sheet was 1.2 m$^2$/g, and thus, it was considered that the sintered fibers had micropores.

Example 15

The gel fiber web sheet prepared in Example 3 was dried at 150° C. for 30 minutes. The average fiber diameter after drying was 480 nm. This dried gel fiber sheet was analyzed by FT-IR, and a peak due to a butoxy group was observed.

Example 16

Sn(OnBu)$_3$Cl dissolved in butanol at a concentration of 2 mol/kg was used as a tin material. Sn(OnBu)$_3$Cl, ethyl lactate, and 2-propanol were mixed at a molar ratio of 1:1:8, and stirred at room temperature for 7 days. Into the resulting solution, hydrazine monohydrochloride and water were added so that the molar ratio of hydrazine monohydrochloride, water, and 2-propanol became 0.0125:1:8, and the whole was stirred at room temperature for 1 day. The resulting mixture was concentrated to 33.5% by weight as a concentration of tin oxide to prepare a spinning solution.

Electrospinning using this spinning solution was carried out under the conditions described in Example 1. A stable spinning could be maintained for 2 hours or more.

The obtained gel fibers were sintered by gradually raising the temperature to 450° C. over 2 hours and then maintaining the temperature at 450° C. for 2 hours to obtain nanofibers of tin oxide. The average fiber diameter after sintering was 900 nm.

Industrial Applicability

The inorganic nanofibers obtainable by the process of the present invention may be used as, for example, a filler for reinforcement, an electronic material (such as a separator, or electrodes for solar cells), a catalyst (such as a photocatalyst), a catalyst support, a heat insulating material, a sound-absorbing material, or a heat-resistant filter.

What is claimed is:

1. A process of manufacturing inorganic nanofibers, said process comprising
   forming inorganic gel fine fibers by electrospinning using a sol solution containing an inorganic component as a main component, but not containing an organic polymer, wherein the sol solution contains a metal alkoxide having a high reactivity and a salt catalyst, and the salt catalyst is a salt of a compound having an N—N bond, an N—O bond, an N—C=N bond, or an N—C=S bond, and
   heat-treating the inorganic gel fine fibers to obtain the inorganic nanofibers.

2. The process according to claim 1, wherein the sol solution further contains an additive to control the reactivity of the metal alkoxide:

3. The process according to claim 1, wherein the metal alkoxide having a high reactivity is titanium alkoxide, zirconium alkoxide, or tin alkoxide.

4. The process according to claim 2, wherein the metal alkoxide having a high reactivity is titanium alkoxide, zirconium alkoxide, or tin alkoxide.

* * * * *